(12) United States Patent
ÅBerg et al.

(10) Patent No.: US 8,879,566 B2
(45) Date of Patent: Nov. 4, 2014

(54) METHOD FOR GROUPING TERMINATIONS (75) Inventors: Fredrik Gustav ÅBerg, Kyrkslätt (FI); Erkki Joensuu, Siunitio (FI); Tuomas Erke, Espoo (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 484 days.

(21) Appl. No.: 13/127,872

(22) PCT Filed: May 4, 2009

(86) PCT No.: PCT/EP2009/055364
§ 371 (c)(1),
(2), (4) Date: May 5, 2011

(87) PCT Pub. No.: WO2010/052035
PCT Pub. Date: May 14, 2010

(65) Prior Publication Data
US 2011/0268128 A1    Nov. 3, 2011

(30) Foreign Application Priority Data

Nov. 5, 2008  (WO) ................. PCT/EP2008/064995

(51) Int. Cl.
```
H04L 12/28    (2006.01)
H04L 12/56    (2006.01)
H04L 12/24    (2006.01)
H04M 3/08     (2006.01)
H04L 29/06    (2006.01)
H04W 92/24    (2009.01)
H04M 7/12     (2006.01)
H04M 3/24     (2006.01)
```

(52) U.S. Cl.
CPC ............... *H04W 92/24* (2013.01); *H04L 12/24* (2013.01); *H04M 3/085* (2013.01); *H04L 29/06224* (2013.01); *H04M 3/247* (2013.01); *H04L 29/06183* (2013.01); *H04L 29/06272* (2013.01); *H04L 65/1043* (2013.01); *H04L 29/06244* (2013.01); *H04L 41/00* (2013.01); *H04L 65/80* (2013.01); *H04M 7/125* (2013.01); *H04L 29/06231* (2013.01); *H04L 29/06238* (2013.01); *H04L 29/06027* (2013.01)
USPC ........................................................ 370/401

(58) Field of Classification Search
None
See application file for complete search history.

(56) References Cited

U.S. PATENT DOCUMENTS

| 6,778,653 | B1 * | 8/2004 | Kallas et al. ............. 379/201.02 |
| 7,466,710 | B1 | 12/2008 | Clemm et al. | |
| 2010/0322262 | A1 * | 12/2010 | Lin ................................ 370/401 |

FOREIGN PATENT DOCUMENTS

WO      WO 03/107619 A    12/2003

* cited by examiner

*Primary Examiner* — Ayaz Sheikh
*Assistant Examiner* — Blanche Wong
(74) *Attorney, Agent, or Firm* — Roger S. Burleigh (57) ABSTRACT

Method for grouping terminations of a media gateway by a grouping parameter. When a command containing a grouping parameter is received, the command is executed for a termination if the grouping parameter contained in the received command corresponds to the grouping parameter stored in connection with said termination.

15 Claims, 7 Drawing Sheets

| TERMINATION ID | MGC G. PARA | MGC-MG G. PARA | MG G. PARA |
|---|---|---|---|
| TERMINATION 1 | 1 | 0 | 7 |
| TERMINATION 2 | 0 | 1 | 7 |
| TERMINATION 3 | 0 | 2 | 6 |
| TERMINATION 4 | 1 | 3 | 4 |

METHOD FOR GROUPING TERMINATIONS

TECHNICAL FIELD

This invention relates to a method for exchanging commands between a media gateway and a media gateway controller, to a method for grouping terminations of a media gateway and to the media gateway or media gateway controller itself.

BACKGROUND

The trend in mobile communication systems goes towards high capacity mobile switching center (MSC) servers which are also scalable. A typical architecture for such a system is a blade cluster structure with a plurality of blades. Transmission lines that carry payload are terminated in media gateways and the switching of these resources is controlled by the MSC server. Furthermore, a pool of terminations is provided at the media gateway, the pool of terminations being controlled by the different blades of the MSC. In case one blade of the MSC server fails, the terminations controlled by said blade have to be released in order to make them available for other calls. In this context, the terminations controlled by a failed blade need to be released in an efficient way. One possibility to release the terminations controlled by the failed blade would be to subtract the different terminations one by one by sending a subtract command to each termination. However, this represents an unacceptable amount of signaling and recovery time. The same problem occurs when a board in the media gateway fails and when the terminations of that board need to be taken out of usage.

H.248 is for a control of elements in a multimedia gateway and is used as a control protocol between the media gateway and the media gateway controller. In this protocol a wildcard mechanism is known using two types of wildcards with termination IDs. These two wildcards are "ALL" and "CHOOSE". The former "ALL" is used to address multiple terminations at once while the latter is used to indicate to the media gateway that it should select a termination satisfying a partially specified termination ID.

A termination for a media gateway is a logical entity which is the source and/or the sink of media and/or control streams. Each termination has a unique entity, the termination ID.

A context is an association between a number of terminations, the context describing the topology (who hears/sees whom) and the media mixing and/or switching parameters if more than two terminations are involved in the association. A context is created by adding the first termination and it is released by removing/subtracting the last termination.

There are many reasons why a group of terminations needs to be grouped in the media gateway or the media gateway controller which can be the MSC server. By way of example terminations may be grouped due to their different capabilities, type of security level, such as trusted or non-trusted domain, or any other aspect which is wanted based on a set of given rules.

A traditional way of grouping terminations is based on the wildcard mechanism, where certain parts of the termination identifiers in the H.248 protocol are used. Additionally, a priority indicator with value range from 0 to 15 is known from the H.248 protocol: the priority is used for a context in order to provide the media gateway with information about a certain precedence handling for a context. The media gateway controller can also use the priority to control autonomously the traffic precedence in the media gateway in a smooth way, e.g. during restart, when a lot of contexts must be handled simultaneously. Priority 0 is the lowest priority and a priority of 15 is the highest priority.

However, the handling is not optimized from a H.248 point of view, meaning that the grouping for terminations is not very flexible and not very scalable. In the H.248 protocol the termination identifier may be defined as a 32 bit value or a 64 bit value. Using a certain part of the termination identifier, e.g. the three least significant bits, for a certain purpose, for example for server identification, would introduce proprietary logic in both the server node and the media gateway. The H.248 protocol is also used between devices from different vendors, so that this kind of logic does not work in a multi-vendor environment.

Any change to the existing termination structure leads to backwards incompatibility and upgrade problems with older products that do not support the given termination identifier format. At present there is no efficient way to handle (subtract, move or modify) a massive set of terminations, where a priority indicator is set to a certain value or terminations of a certain service type or terminations relating to a certain type of interface, such as network internal or network external from a media gateway point of view. Additionally, it is difficult to handle a set of terminations based on the type of destination (trusted domain or non-trusted domain) or based on any other given policy function.

SUMMARY

Accordingly, a need exists to provide an efficient way for addressing a plurality of terminations with a minimum number of messages or commands to be exchanged.

This need is met by the features of the independent claims. In the dependent claims preferred embodiments of the invention are described.

According to one aspect of the invention a method for exchanging commands between a media gateway and a media gateway controller is provided, the method comprising the step of receiving a grouping parameter relating to a termination. The grouping parameter is then stored in connection with said termination, and when a command containing a grouping parameter is received, it is checked whether the grouping parameter contained in the received command corresponds to the grouping parameter stored in connection with said termination. When the grouping parameter contained in the received command corresponds to the grouping parameter stored in connection with said termination, the command is executed for said termination. With the use of a grouping parameter it is possible to classify and group terminations without having to alter the structure of the termination identifier definition. With the use of a grouping parameter the invention allows to send a single command to the media gateway or the media gateway controller in order to address all terminations having the grouping parameter that corresponds to the grouping parameter contained in the received command. In the above method the receiving side is described.

According to another aspect of the invention the transmitting side is also addressed by providing a method for grouping terminations of a media gateway, the method comprising the steps of allocating, by one of the media gateway or the media gateway controller, a grouping parameter to a group of terminations. When an event influencing said group of terminations is detected, a command containing said grouping parameter is transmitted from said one of the media gateway or media gateway controller to the other of said media gateway or media gateway controller. According to this aspect of the invention the transmission side determines which terminations are grouped by using a grouping parameter. The allocation of a grouping parameter to a termination can also be considered as providing a mask, the mask defining to which terminations the mask applies.

Preferably, the command is addressed to a plurality of terminations, wherein the grouping parameter allows to determine to which at least one termination among the plurality of terminations the command is addressed. This can be achieved by determining the terminations for which the grouping parameter contained in the received command corresponds to the grouping parameter stored in connection with the corresponding terminations. By way of example, the grouping parameter can be used in connection with the wildcarding mechanism, where multiple terminations are addressed by a single command.

According to one embodiment of the invention, the following grouping parameters, each grouping parameter covering a predetermined range of values, may be used. One possible grouping parameter may be a MGC grouping parameter for which the media gateway controller is aware of the meaning of the different values the grouping parameters may have. Additionally, a MGC-MG grouping parameter may be used, for which the media gateway and the media gateway controller are both aware of the meaning of the values of the grouping parameter. Additionally, a MG grouping parameter may be used for which the media gateway is aware of the meaning of the values of the grouping parameter. By way of example, the MGC grouping parameter may be a grouping parameter grouping the terminations depending on the fact whether they are used for emergency calls or non-emergency calls. One value of the grouping parameter may be given to emergency calls, whereas another value may be given to non-emergency calls. The media gateway controller knows the meaning of the different values of this MGC grouping parameter. An example of a MGC-MG grouping parameter may be a parameter for which, depending on the type of interface used, a voice quality enhancement needs to be activated or not. The media gateway may store the value of this parameter and may have internal logic like reservation of a certain type of resources based on the value of this parameter.

An example of a MG grouping parameter may be a parameter allocated by the media gateway, such as allocating the same MG grouping parameter to all terminations of one physical board of the media gateway.

According to one embodiment of the invention at least two different grouping parameters are received and stored in connection with a termination, wherein, if the received command contains two grouping parameters, the command is only executed for the terminations when said at least two different grouping parameters stored in connection with said termination correspond to the two grouping parameters contained in the received command. In this embodiment the two grouping parameters were connected by the Boolean logic AND. However, it is also possible that grouping parameters in a command are combined with another Boolean logic, such as OR. Furthermore, an even more complex Boolean expression may be used instead of a simple AND or OR construction.

The grouping parameter may be set in connection with a termination during the seizure of the termination. However, it is also possible that the grouping parameter will be stored in connection with the termination at a later stage, e.g. with a modify or move command. Preferably, the grouping parameter will be set until the termination is released.

Preferably, rules describing the meaning of the different grouping parameters can be stored in a centralized database accessible by a plurality of different media gateway controllers, the media gateway controllers accessing said centralized database for retrieving the rules for the different grouping parameters. This database may be defined as a new physical node in the network or may be designed as a logical component within some other physical node. By way of example this database may be integrated into the node of the media gateway controller.

With the use of a grouping parameter the grouping of terminations depending on different criteria is possible. By way of example the grouping parameter allows to prioritize the terminations used for a call by using a priority-dependent grouping parameter. Another possibility is to use a grouping parameter allowing to differentiate different kinds of interfaces used in connection with different terminations by using different values of the MGC grouping parameter for each interface. In another embodiment the grouping parameter allows to determine for which termination a voice enhancement is necessary by assigning different values of a grouping parameter to a termination depending on the fact whether a voice enhancement is necessary or not. In another embodiment the grouping parameter may be used to identify a processing unit or a board of the media gateway or media gateway controller that is controlling said termination in connection with a call by assigning a processing unit depending grouping parameter to said termination. By way of example in case a processing unit or blade is failing, the terminations controlled by the failing blade can be released using one single message by sending a message to the media gateway having the grouping parameter allowing to identify the failing blade. The media gateway can then release all terminations controlled by the failing blade. In the event of a failure of a processing unit of the media gateway, the media gateway controller can also be informed of the failure of the terminations present on said failing board by using a single message containing a board identifier of the failing board as a grouping parameter.

One possibility to check whether the media gateway or the media gateway controller supports the use of a grouping parameter dependent execution of commands is the package auditing mechanism of the H.248 protocol. In case the receiving unit does not support a grouping parameter dependent execution, it can respond with a message that this mechanism is not supported.

Depending on the given policy and usage of a grouping parameter, the range of values of a grouping parameter may be large or small. Sometimes a two value range is sufficient, e.g. for indicating whether a voice enhancement is necessary or not, whereas for other grouping parameters a larger range may be needed, e.g. for prioritizing a call. The range of possible values of the grouping parameters may be stored in a H.248 protocol package. This H.248 package can be the Base Root Package or a specific package designed for the purpose, such as a grouping package.

When a command containing a grouping parameter has been transmitted, the terminations, for which the grouping parameter contained in the received command corresponds to the grouping parameter stored in connection with the termination, can be specified in a reply message to the message containing the command. The terminations and contexts having stored grouping parameters matching to those specified in the command can be returned in a reply message to the transmitting unit.

Additionally, it should be possible to reset the grouping parameters stored in connection with a termination when it is detected that a processing unit controlling said termination fails.

According to another aspect of the invention, a media gateway or media gateway controller is provided working as discussed above. The media gateway or media gateway controller comprises a receiver receiving the command containing the grouping parameter. Additionally, a database is provided, where the received grouping parameter is stored in connection with the termination. When a command containing a grouping parameter is received, a control unit checks whether the grouping parameter contained in the received command corresponds to a grouping parameter stored in connection with a termination. When the control unit detects that the two grouping parameters coincide, it executes the command for said termination. Furthermore, a media gateway or media gateway controller is provided allocating grouping parameters to a group of terminations and transmitting a command containing the grouping parameter to the receiving unit when an event is detected for which it becomes necessary to transmit a command to said group of terminations.

Above and below reference was made to "one embodiment" or "an embodiment", meaning that a particular feature, structure or characteristic described in connection with said embodiment is included in at least one embodiment of the invention. However, the appearances of the phrases "one embodiment" or "an embodiment" in various places throughout the specification are not necessarily all referring to the same embodiment. Furthermore, the particular features and structures or characteristics may be combined in any suitable manner in one or more embodiments.

BRIEF DESCRIPTION OF THE DRAWINGS

The invention as well as a preferred mode of use and further advantages thereof will best be understood by reference to the following detailed description of illustrative embodiments when read in conjunction with the accompanying drawings, wherein.

DETAILED DESCRIPTION

Figure 1:
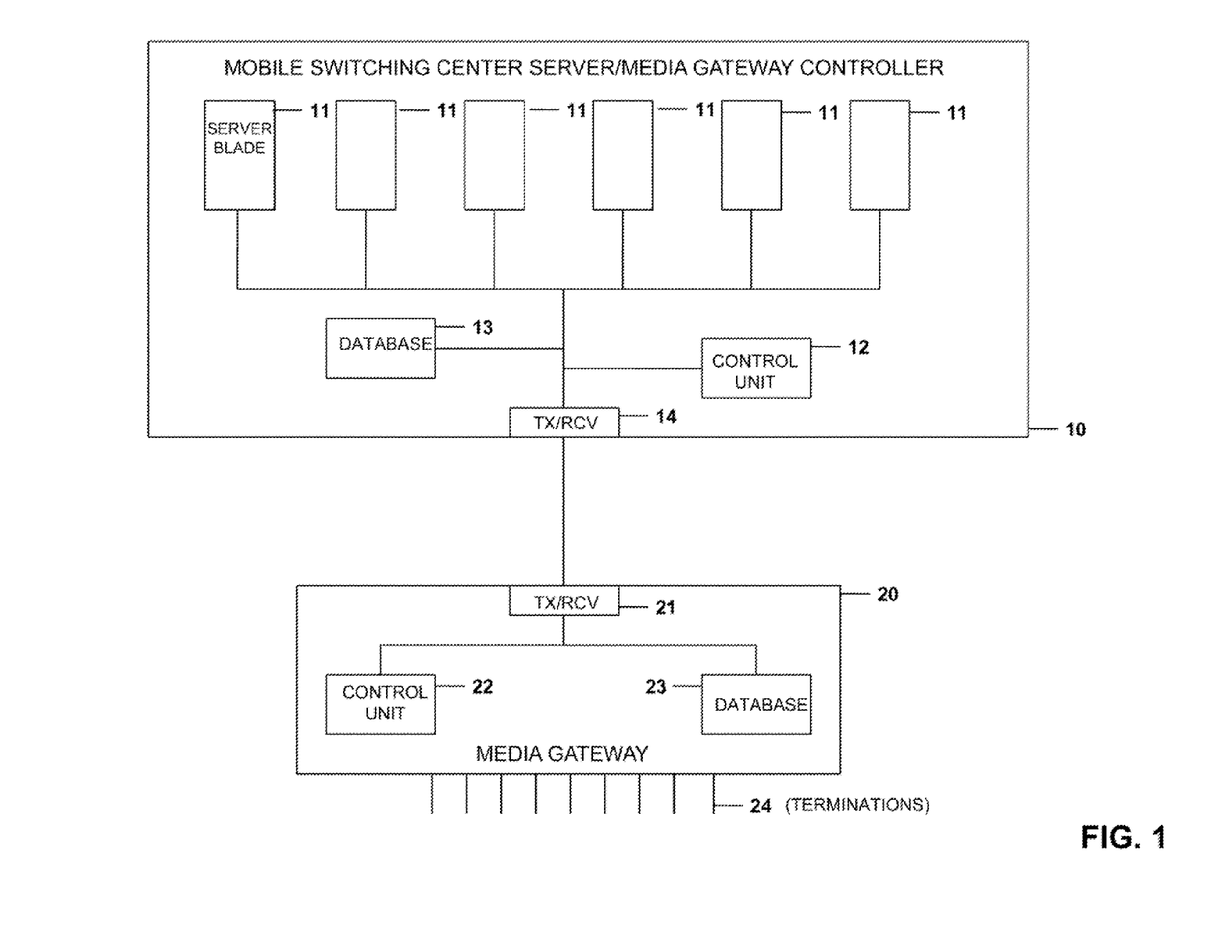
FIG. 1 shows a functional block diagram of a media gateway and a media gateway controller allowing to address a plurality of terminations with a single message.

With reference now to the Figs. and in particular with reference to FIG. 1 a schematic block diagram of a media gateway controller and a media gateway is shown. In the embodiment shown, the media gateway controller is an embedded function of a mobile switching center server 10. However, the media gateway controller needs not necessarily be incorporated into the MSC server. In the embodiment shown, the MSC server 10 has a multi-blade architecture with a plurality of blades 11, each blade 11 having its own processing unit (not shown), each processing unit controlling terminations 24 of the media gateway 20. The terminations 24 may be provided as a pool of terminations and each of the blades 11 may control any of the terminations 24. In the event of a failure of one blade of the media gateway controller, the terminations controlled by said blade have to be released in order to allow other blades to use these terminations for signaling. In the embodiment shown, the media gateway controller is connected to one media gateway. However, it should be understood that the media gateway controller may be connected to a plurality of media gateways, but for ease of reading and without limiting the invention reference is made to only a single media gateway 20. The media gateway controller 10 sets up and releases end-to-end connections, handles mobility and handover requirements during a call and takes care of charging and accounting. For controlling the terminations 24, messages are transmitted from the different blades to the termination to which the message is related. By way of example the message may be a message to add a termination, to subtract a termination, or to modify a termination. The media gateway controller or MSC server 10 comprises a transmitting/receiving unit 14. Additionally, a control unit 12 is provided that allocates a grouping parameter to several terminations, thereby building a group of terminations identified by the same grouping parameter. Additionally, a database 13 is provided storing a grouping parameter in connection with a termination 24. In case a message containing a grouping parameter is received from the media gateway 20, the control unit also checks to which terminations of the media gateway the message applies. The media gateway comprises a transmitting/receiving unit 21, a control unit 22 allocating a grouping parameter to a group of terminations and checking, when a command containing a grouping parameter is received, whether the received command is valid for a predetermined termination by checking whether the grouping parameter contained in the received command corresponds to the grouping parameter stored in connection with said termination. In a database 23 the grouping parameter is stored in connection with said termination. Database 23 allows to link the grouping parameters to the different terminations 24.

Both control units 12 and 22 allocate a grouping parameter to a termination and check whether a grouping parameter received in a command coincides with a grouping parameter stored in connection with a termination.

Figure 3:
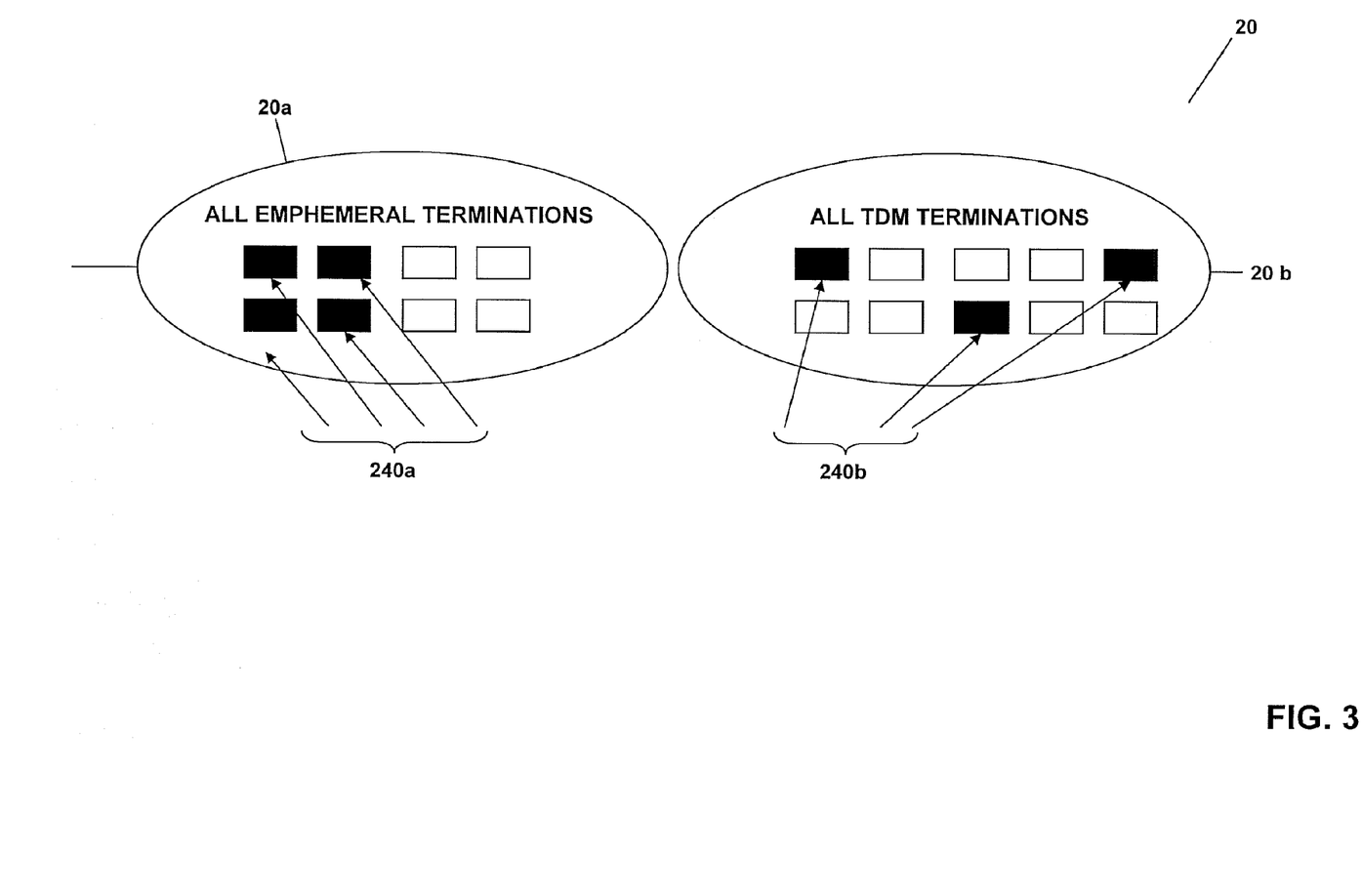
FIG. 3 shows an embodiment where a grouping parameter helps to group terminations independent of the type of termination.

In the embodiment shown in FIG. 3 a first example of grouping terminations is shown. In a media gateway 20 both ephemeral terminations and TDM terminations are present. The media gateway shown comprises two different boards, board 20a and 20b. In board 20a all ephemeral terminations are grouped consisting of core network terminations and radio network (RNC) terminations. TDM terminations grouped on board 24b consist of both PSTN and A interface terminations. The media gateway controller can now group terminations where a certain function to be controlled is to be activated or deactivated in one group and adds a grouping parameter with a unique value for this group. In the embodiment shown, the grouping parameter having this unique value was added for the terminations having a shaded area, the terminations 240a on board 20a and the terminations 240b on board 20b. By way of example the grouping parameter could be for example a voice quality enhancement function to be turned on only for A and Iu interface terminations. The mobile switching center server as a media gateway controller sends a request to the media gateway with context ID=ALL, terminations ID=ALL and also includes the grouping parameter with the above-mentioned unique value which narrows the request scope to cover only the parts which have been tagged with said unique value. This example shows that different types of terminations can be manipulated with one command independent of their termination type, be it a TDM or ephemeral termination.

Figure 2:
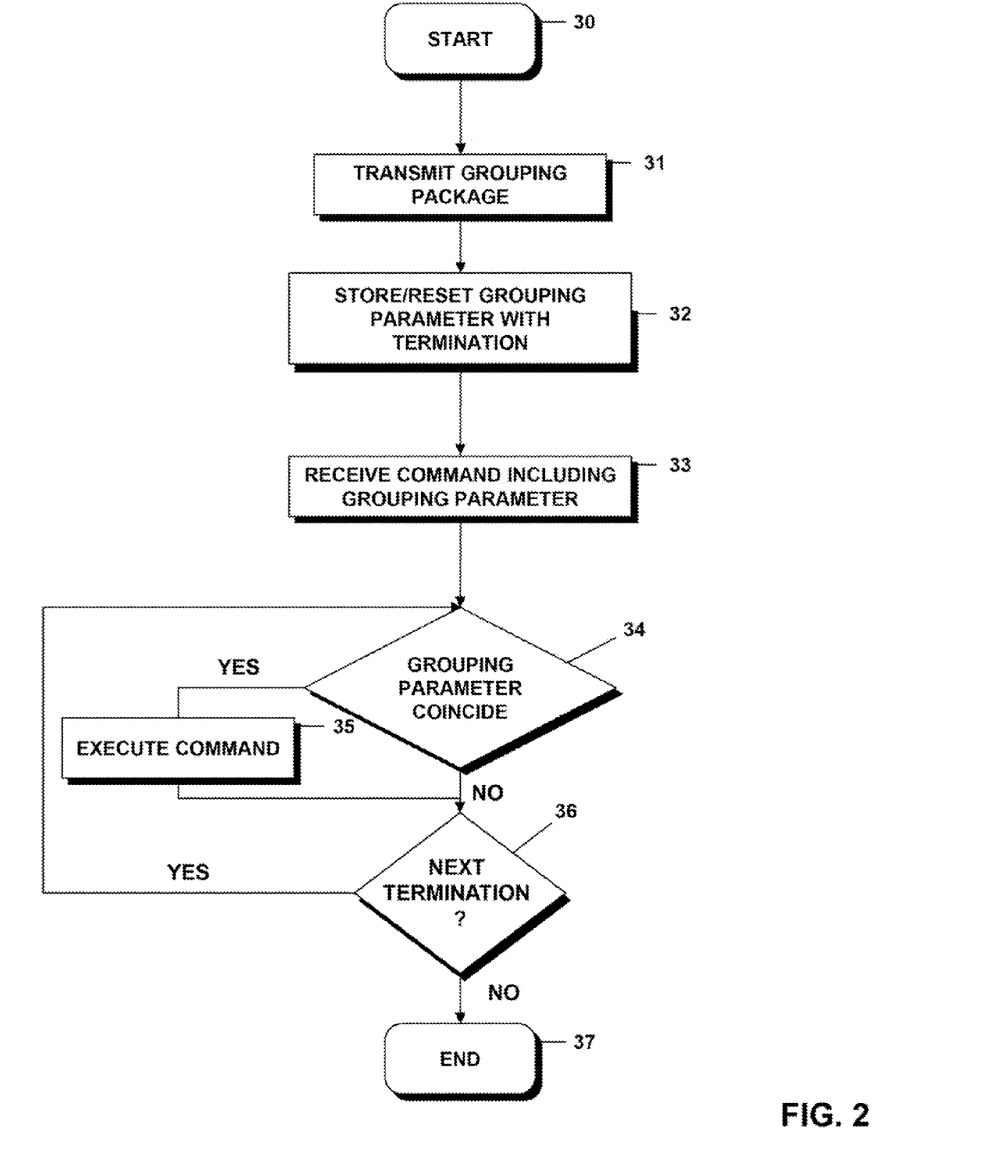
FIG. 2 shows a flowchart illustrating the operation of the media gateway controller or the media gateway when a command containing a grouping parameter is received.

In FIG. 2 the steps carried out when a plurality of terminations is addressed by one single command are summarized. The method starts in step 30. In step 31 the transmitting unit which can be the media gateway controller or the media gateway groups terminations by transmitting a grouping package in step 31 determining that a certain connection or termination shall belong to a certain group. At the receiving side the grouping parameter is stored in connection with the termination (step 32). When an event is detected that influences that group of terminations, a message is sent from the transmitter containing the grouping parameter allowing to address a predetermined group of terminations. This message containing the command with the grouping parameter is received in step 33. In step 34 it is asked whether the grouping parameter stored in connection with a termination coincides with the grouping parameter contained in the received message. If this is the case, the command is executed in step 35 for said termination. Then the query of step 34 is again carried out for the next termination until all possible terminations of the media gateway have been addressed. If it is detected in step 34 that a termination does not have a grouping parameter that corresponds to the grouping parameter received with the command, the command is not executed for that termination. When all terminations have been checked in step 36, the method ends in step 37.

The grouping parameter can be included in a command as a figure representing the value of the parameter. However, it is also possible to introduce a predetermined bit pattern corresponding to the value of the parameter, wherein the bit pattern being stored at the terminations is compared to the bit pattern contained in the command.

Figure 4:
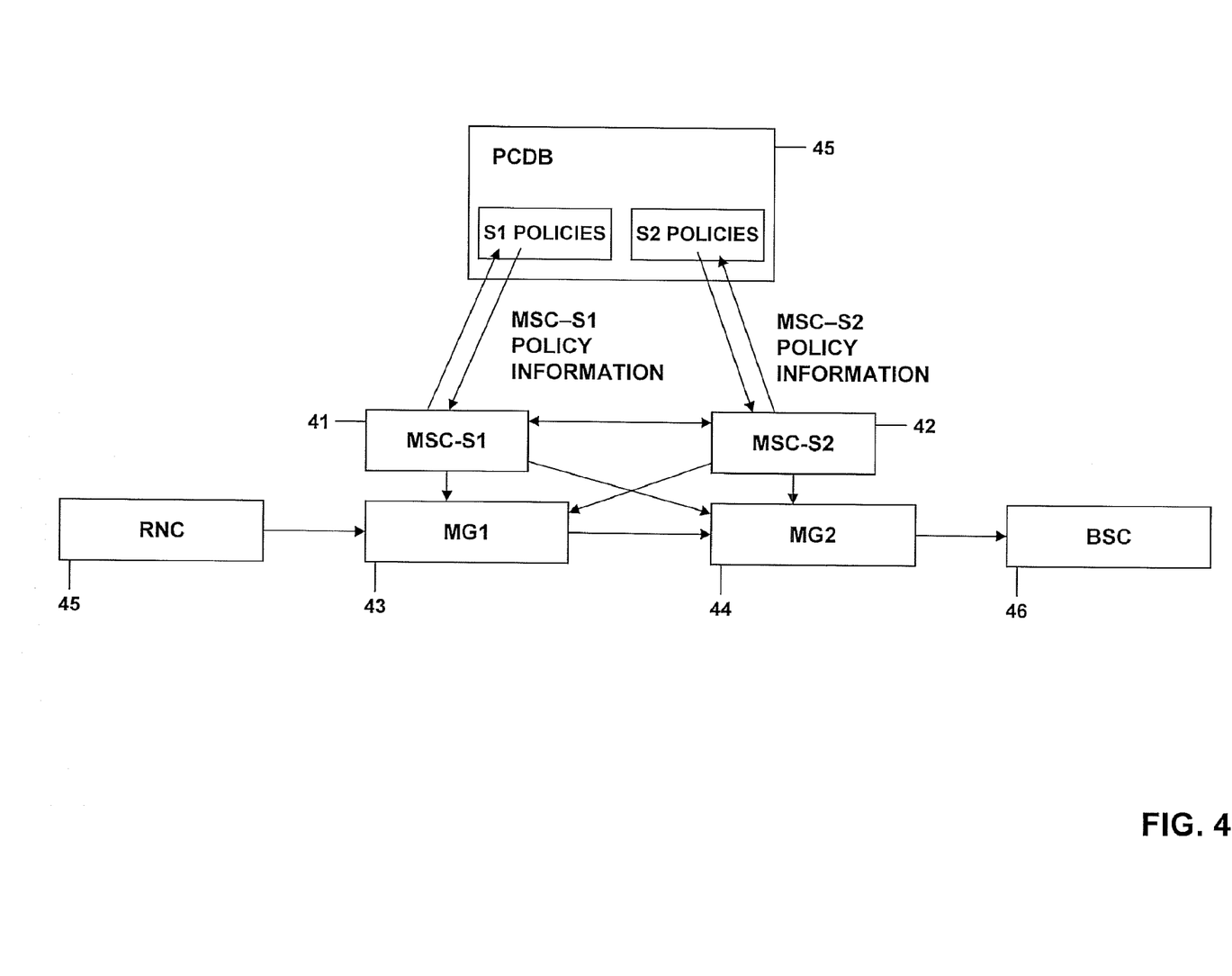
FIG. 4 shows a block diagram of a system where the policies and rules are stored in a centralized database accessible by a plurality of media gateway controllers.

In FIG. 4 a system is shown where the rules or policies for the grouping parameters are provided in a centralized database 45. This database PCDB (Policy Control Database) can be integrated as a logical component in a mobile switching center server or can be a separate physical node. The database 45 contains the policies which can be based on for example network dimensioning and configuration related data. The policy information is used by the different MSC servers, in the embodiment shown the two MSC servers S1 and S2 referenced with numerals 41 and 42. The database can have policies for the different MSC servers, such as the policies or rules for MSC server 41 and policies or rules for MSC server 42. The configuration of the different grouping parameters can be done centrally in the database 45. Different MSC servers may have the same or different policies depending on their capabilities. The MSC servers 41 and 42 are in connection with the media gateways 43 and 44. In the embodiment shown in FIG. 4 an example is shown where mobile user data are transmitted via the radio network controller 45 via the media gateways to a base station controller 46.

The following grouping parameters may be stored in the central database 45. The grouping parameters may be differentiated depending on which entity is aware of the different values the grouping parameters can have. One example of a grouping parameter is the MGC grouping parameter, which can be a 32 bit parameter which has a meaning to the database 45 and the MSC servers, but not to the media gateway. This grouping parameter is formed based on policy logic. It can be given any value ranges based on the chosen policy. One simple policy is to give a first value, such as 1, to emergency calls and to give another value, such as 0, to a non-emergency call. A more advanced solution is to define grouping parameters in the IP network based on IP ranges and their bandwidth capacities or based on whether the domain is trusted or not. Another example is a MGC-MG grouping parameter which has a meaning to the MSC server (and the database 45) and the media gateway. The media gateway stores the value of this parameter and has internal logic like the reservation of a certain type of resource based on the value of this parameter. The MSC server can implement even more advanced logic using this parameter compared to only using the MGC grouping parameter. Last but not least an MG grouping parameter may be provided that is allocated by the media gateway, the mobile switching center server storing the parameter value which was allocated by the media gateway.

In addition to these parameters the possible range of values of the different parameter is added to the H.248 protocol, so that the media gateway database tables memory handling can be optimized to the right level, as the maximum number of values of the different grouping parameters can be high or low.

The MGC grouping parameter or MGC-MG grouping parameter may be sent in connection with an add request, modify request or move request or in an audit response message. Furthermore, it is possible to adapt service change messages in order to be able to handle these parameters. The possible values of the MGC grouping parameter or MGC-MG grouping parameter could be added to a H.248 Base Root Package which contains other existing maximum limits to be used in the H.248 protocol. Alternatively a separate H.248 grouping package could be used for this purpose.

The MSC servers can use a H.248 audit request message to audit certain MGC grouping parameter values. Furthermore, the MSC server may have some additional logic based on the audit response logic if needed.

Based on the grouping parameters the transmitting unit transmitting a command containing the parameters can manipulate, such as add, move, modify or release, terminations, namely a group of terminations with a single message.

Figure 7:
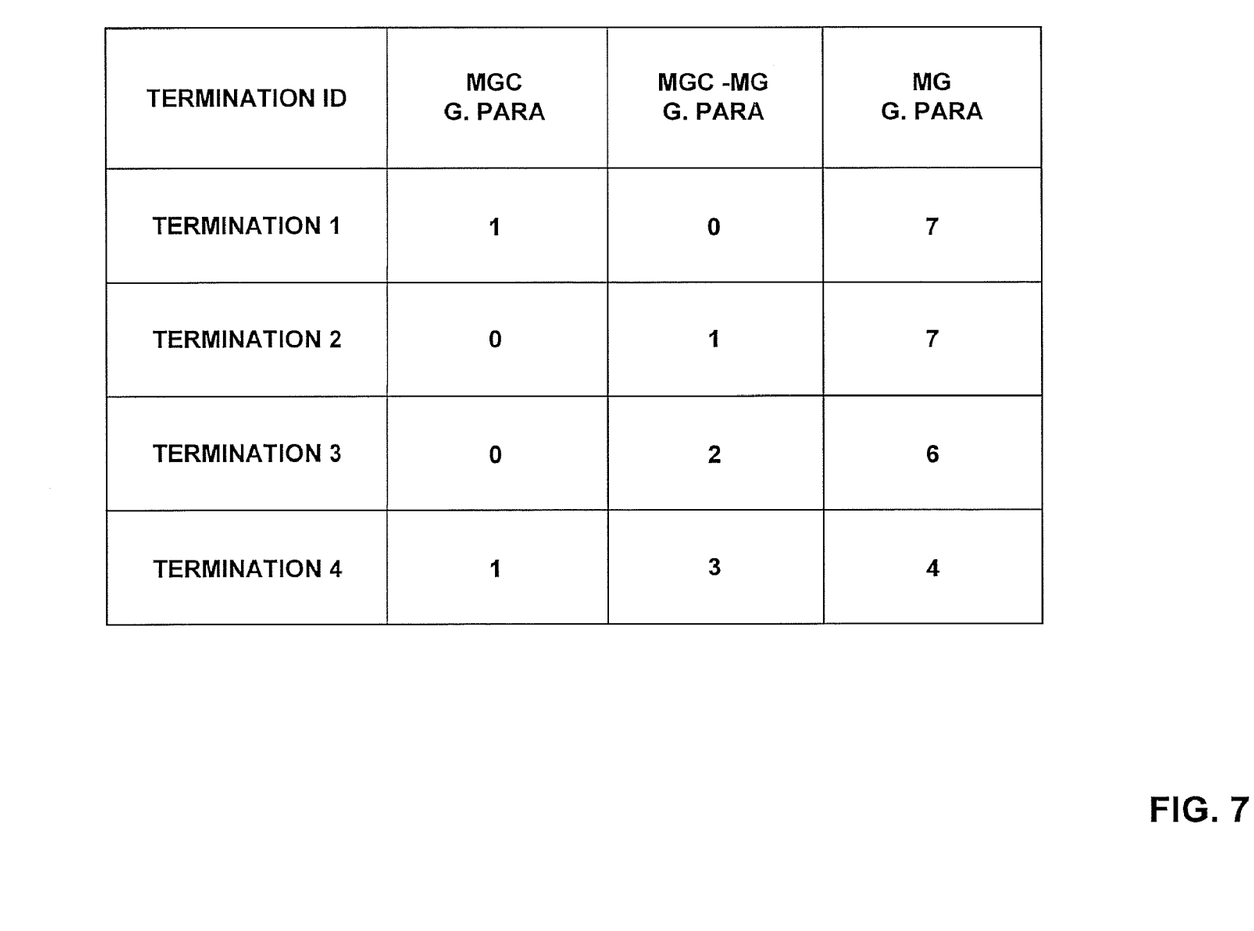
FIG. 7 shows an example of grouping parameters as stored in a media gateway.

In connection with FIG. 7 an example of a database is shown how the different parameters are stored in the media gateway or the media gateway controller. The structure of the termination ID is not dependent on the usage of the grouping parameters. In the table shown the different parameters are stored in connection with the different terminations. By way of example the MGC grouping parameter 1 may indicate that the termination is used for an emergency call, whereas the MGC grouping parameter 0 is used for a non-emergency call. In the table shown terminations 1 and 4 are used in connection with emergency calls, whereas terminations 2 and 3 are used in connection with non-emergency calls. For the MGC-MG grouping parameter different values are used. By way of example the value 0 of termination 1 may mean that it is used for an Iu interface with no voice quality enhancement active. The value 1 may be used for an Iu interface with the voice quality enhancement active, the value 2 may be used for an A interface termination with no voice quality enhancement, the value 3 being used for an A interface termination with an active voice quality enhancement. As far as the MG grouping parameter is concerned, the indicated values may correspond to the priority levels for calls handled by the different terminations, the higher the value the higher the priority or vice versa.

The use of the different grouping parameters is illustrated by the following examples. The media gateway controller adds, moves or modifies a single termination in a context and includes in a message a MG grouping parameter which has a value based on the given policy function. The media gateway controller notices that the policy functions require low priority calls to be released, e.g. with a MG grouping parameter set to a value of 3 or lower. The media gateway controller can send a service change or subtract request message including the wildcard context ID=ALL, termination ID=ALL and a list of MG grouping parameters with values of 0 to 3 to the media gateway giving the gateway order to release the terminations with the given grouping parameter. The media gateway can then subtract the terminations with the given MG grouping parameter having values from 0 to 3. In this example the different grouping parameters 0 to 3 sent in one message may be combined with an "OR" logic.

In another example Nb, Iu and A interfaces are used for IP transport and the MGC grouping parameter. 1 may be reserved for Iu interface over IP terminations, the MGC grouping parameter 2 may be reserved for A interface over IP terminations and MGC grouping parameter 3 may be reserved for Nb interface over IP terminations. The MSC server acting as media gateway controller moves, adds or modifies a single termination in a context, the MSC server including in a message to the media gateway the MGC grouping parameter. Later on the mobile switching center server may find out that voice quality enhancement functions need to be turned on for Iu over IP terminations but not for the other type of terminations. For enabling the voice quality enhancement functions for a specific type of terminations, the MSC server may send a single service change message including the wildcard context ID=ALL, termination ID=ALL with the MGC grouping parameter having a value of 1 to the media gateway giving the media gateway the order to enable the voice quality enhancement for all Iu terminations.

In the next example two different grouping parameters are used. As discussed above, the value 0 of the MGC grouping parameter may be reserved for non-emergency calls, whereas the value 1 of this MGC grouping parameter is reserved for emergency calls. For the MGC-MG grouping parameter the value 0 may be given for all Iu interface terminations which require voice quality enhancement to be activated in the media gateway, whereas the value 1 is given to all Iu interface terminations which require no voice quality enhancement to be activated in the media gateway. The MSC server can now add, move or modify a single termination in a context including in a message both the MGC grouping parameter and the MGC-MG grouping parameter having values based on the given policy functions. If the MGC-MG grouping parameter value for a termination is equal to 0, the media gateway reserves voice quality enhancement functions in the media gateway, and if the MGC-MG grouping parameter is equal to 1, the media gateway does not reserve voice quality enhancement functions.

It may happen that the MSC server notices that a given policy function rule tells the system that now the IP terminations which consume the most resources must be released. However, the emergency calls should not be released. First, all terminations having voice quality enhancement in an active state are released except for emergency calls. The MSC server sends a service change or subtract message to the media gateway including the wildcard context ID=ALL, termination ID=ALL and the MGC grouping parameter value set to 0 and the MGC-MG grouping parameter value set to 1. The media gateway subtracts the terminations with the given grouping parameter values. In this example emergency terminations with voice quality enhancement functions are still working in the media gateway and they have a MGC grouping parameter set to 1, so that the media gateway does not subtract these terminations.

Figure 5:
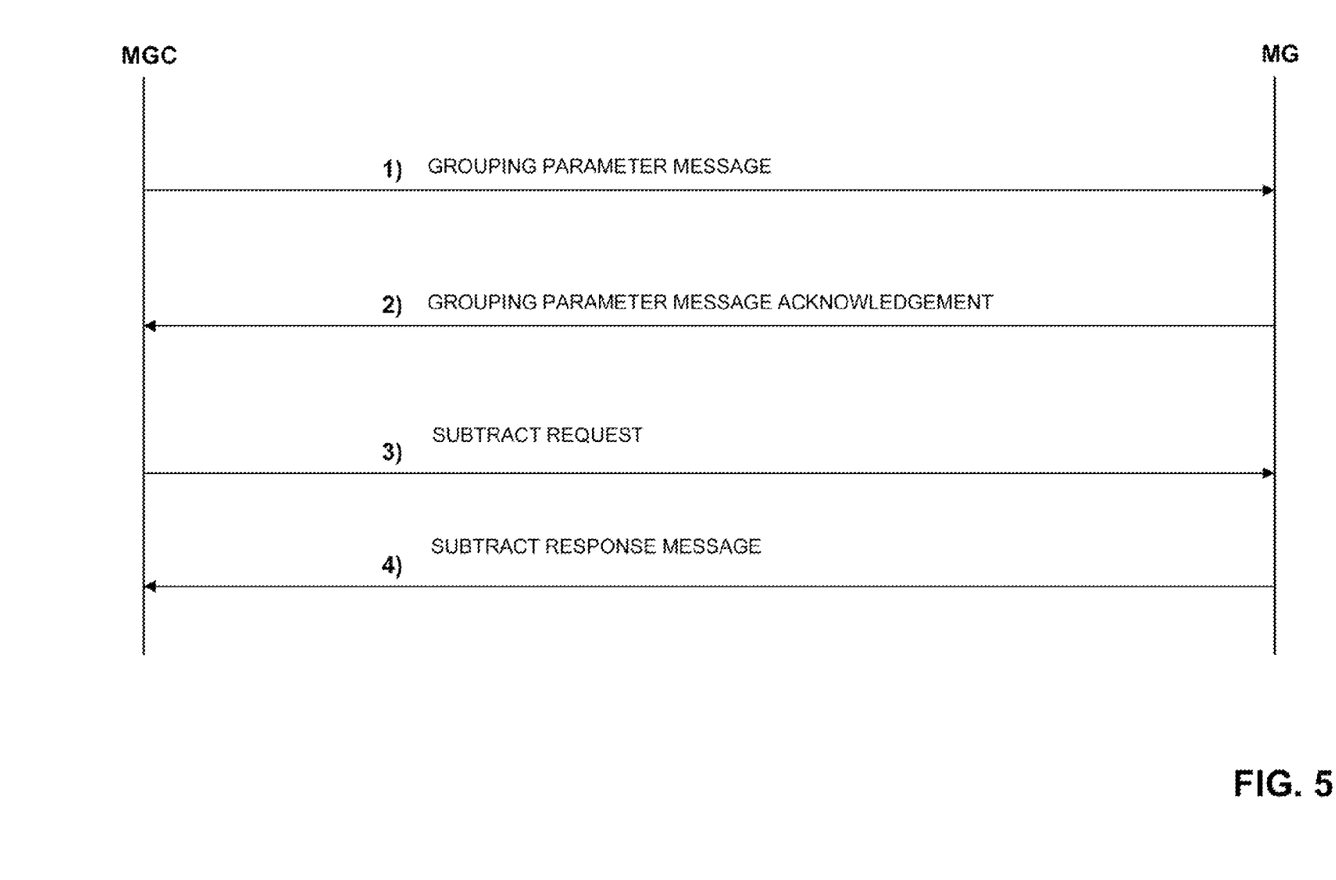
FIG. 5 shows a flowchart where the grouping parameter is set by the media gateway controller.

In FIG. 5 another embodiment is shown where a failure of a blade in the media gateway controller initiates a release of all terminations controlled by said blade. In step 1 of FIG. 5 the media gateway controller sends a message to the media gateway including a grouping parameter having a predetermined value (e.g. value 2) indicating that the blade with a number corresponding to said predetermined value controls this termination.

The media gateway supporting the use of grouping parameters acknowledges the command and stores the grouping parameter related to the termination. Now it may happen that the media gateway controller loses the blade with the predetermined number, such as the blade 2, due to a restart, and it releases all terminations related to blade 2. The server sends in step 3 a subtract request to the media gateway, the subtract request including a wildcard for all contexts and terminations and a grouping parameter set to the value of 2. The media gateway can then find through its database, where all terminations and contexts are stored with the corresponding grouping parameters, those terminations and contexts which were controlled by failing blade 2, the media gateway releasing these terminations and responds to the server in step 4 in a subtract response message.

Figure 6:
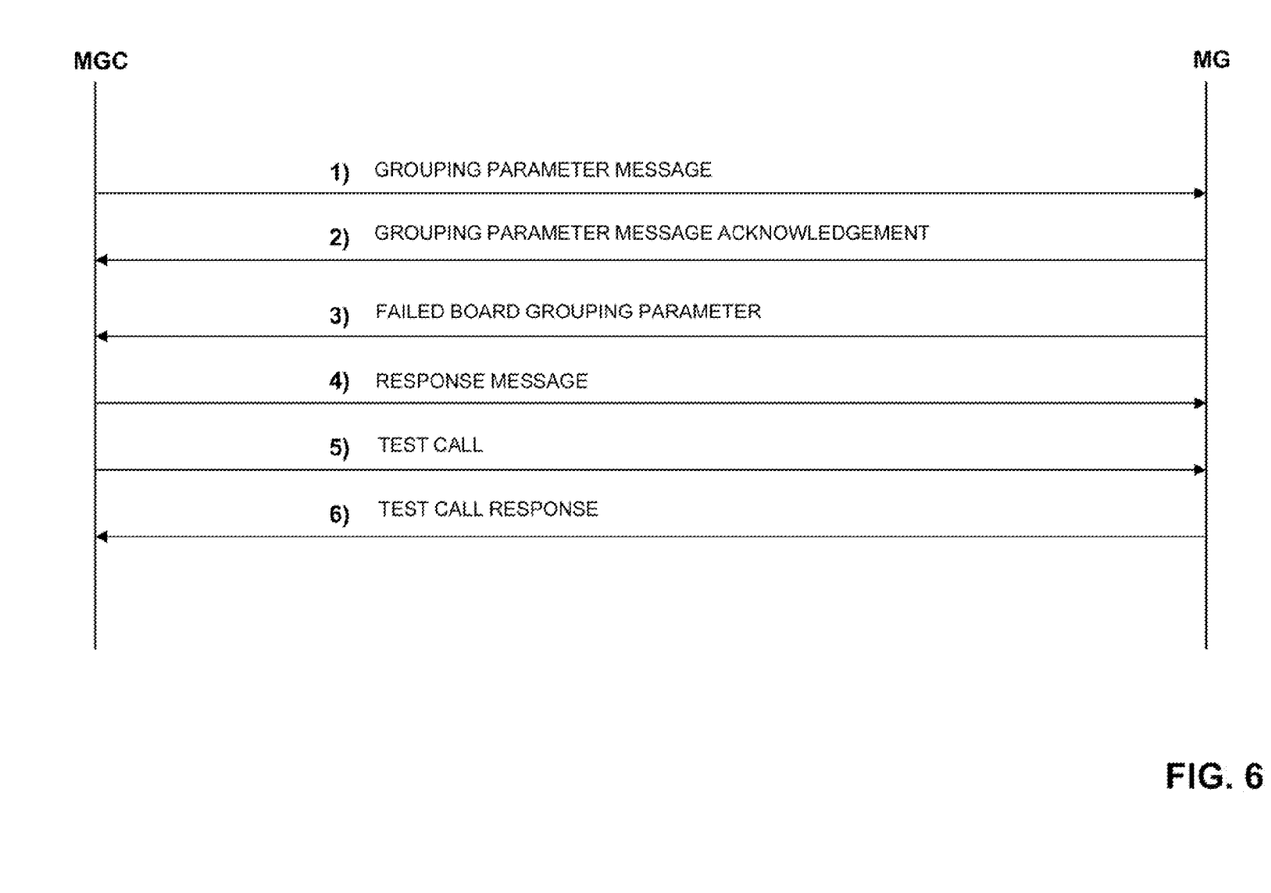
FIG. 6 shows a flowchart where the media gateway uses the grouping parameters.

In the embodiment shown in FIG. 6 an example is shown where the media gateway allocates the grouping parameters, whereas in the embodiment shown in FIG. 5 the media gateway controller had allocated the grouping parameter. In step 1 of FIG. 6 the media gateway controller sends a command to the media gateway including inter alia a grouping parameter having a value, such as the value 3, showing that the blade number 3 in the media gateway controller has relation to this termination. The media gateway supporting this grouping parameter acknowledges the command and stores the grouping parameter relation to that termination. In addition, the media gateway adds its own hardware information to the response signal in step 2. This can be an identification number of the board of the media gateway where the termination is located. If a problem with that board is detected by the media gateway and if the board restarts, all terminations of that board need to be taken out of usage. The media gateway sends a command to the media gateway controller with the context ID=ALL and termination ID=ALL including the grouping parameter of the failed board (step 3). In step 4 the media gateway controller responds with either a notify response message or service change response message to the media gateway and the media gateway controller subtracts all terminations related to that grouping parameter. It can be seen in the network error traces that the cause for restart has been at the restarted board in the media gateway. The media gateway controller can initiate a test call to this board in the media gateway making a new add request containing the same information, the message containing the grouping parameter of the failed board. The sending of this message in step 5 can make sure whether the problem was just temporary or whether there is a systematic problem. The media gateway can respond in step 6 with a respond message, so that the media gateway controller can check whether the board in the media gateway is working again. In case the failed board in the media gateway is an exchange terminal board or media stream board, it can mean that about 30,000 calls are to be released due to the board failure. The number of affected calls depends on numerous parameters, inter alia on the speech coder that is used and the capacity of the exchange terminal board itself. Without the invention the media gateway would have to inform the media gateway controller of every single call problem individually, resulting in about 60,000 messages for 30,000 calls when the acknowledgement message by the media gateway controller is taken into account. The sending of these messages may take tens of seconds. When the media gateway controller receives the fault indication for an individual call, it stores the reason for the call release to the call data record (CDR) for charging post-processing purposes. The operator may give a compensation to the subscriber because the call was released by a network fault or the call data record information is just used for other quality evaluations or if there are subscriber queries. However, when a single or two single messages are sent for each termination involved resulting in a 10 seconds waiting time, it is evident that many subscribers after about 10 seconds will release the silent call. This would lead to a large number of calls that are released due to subscriber release where no special information can be stored in the call data record. With the presently claimed invention it is possible to use only one release request message from the media gateway to the media gateway controller with the grouping parameter indicating the faulty board. As a consequence, the media gateway controller has the possibility to store in all call data records of that board the reason of the call release. Additionally, the media gateway controller can release the calls on a call control plane as fast as possible, as only one message needs to be exchanged.

Summarizing, the present invention allows the handling of a specific type of termination in the media gateway controller in a more efficient and more advanced way. Additionally, the termination identifier structure needs not to be adapted in case a grouping parameter is introduced allowing a backwards compatibility with older products. Furthermore, the discussed solution is applicable for ephemeral and TDM terminations.

The invention claimed is:

1. A method for handling terminations in a media gateway (MG) or a media gateway controller (MGC), the method comprising the steps of:
   receiving a message relating to an individual termination, said message containing a grouping parameter;
   storing the grouping parameter for said individual termination;
   receiving a command addressed to all contexts and all terminations, said command containing a grouping parameter or a Boolean expression of grouping parameters;
   checking, for each individual termination, whether the grouping parameter or Boolean expression of grouping parameters contained in the received command corresponds to grouping parameters for any individual termination; and,
   executing the received command for an individual termination if the grouping parameter or Boolean expression of grouping parameters contained in the received command corresponds to a stored grouping parameter for said individual termination.

2. The method according to claim 1, wherein at least one of the following grouping parameters covering a predetermined range of values is received:
   a MGC grouping parameter for which the media gateway controller is aware of the meaning of the values of the grouping parameter;
   a MGC Media Gateway (MGC-MG) grouping parameter for which the media gateway and the media gateway controller are aware of the meaning of the values of the grouping parameter; and,
   a MG grouping parameter for which the media gateway is aware of the meaning of the values of the grouping parameters.

3. The method according to claim 2, wherein the grouping parameter allows prioritization of the terminations used for a call by using a priority dependent grouping parameter.

4. The method according to claim 2, wherein the grouping parameter allows determination of which termination a voice enhancement is necessary for by assigning a first value of the MGC-MG grouping parameter to terminations for which a voice enhancement is necessary and by assigning another value of MGC-MG grouping parameter to terminations for which no voice enhancement is necessary.

5. The method according to claim 1, wherein at least two different grouping parameters are received and stored in connection with said termination; and wherein, if the received command contains two grouping parameters, the command is only executed for said termination when said at least two different grouping parameters stored in connection with said termination correspond to the two grouping parameters contained in the received command.

6. The method according to claim 1, wherein the grouping parameter is received during a seizure of said termination.

7. The method according to claim 1, wherein rules describing the meaning of different grouping parameters are stored in a centralised database accessible by a plurality of media gateway controllers, the media gateway controllers accessing said centralised database for retrieving the rules for the different grouping parameters.

8. The method according to claim 1, wherein the grouping parameters allow differentiation of different kinds of interfaces used in connection with different terminations by using different values of the MGC grouping parameter for each interface.

9. The method according to claim 1, wherein the grouping parameter allows identification of a processing unit of the media gateway or the media gateway controller that is controlling said termination in connection with a call by assigning a processing unit depending grouping parameter to said termination.

10. The method according to claim 1, wherein it is checked whether the media gateway or the media gateway controller supports the grouping parameter dependent execution of commands by a package auditing mechanism of a H.248 protocol.

11. The method according to claim 1, wherein the range of possible values of the grouping parameter is stored in a H.248 protocol package.

12. The method according to claim 1, wherein the terminations for which the grouping parameter contained in the received command corresponds to the grouping parameter stored in connection with said termination are specified in a reply message to a message containing the command.

13. The method according to claim 1, further comprising a step of resetting the grouping parameter stored in connection with said termination when it is detected that a processing unit controlling said termination fails.

14. The method according to claim 1, further comprising the steps of:
   detecting an event influencing a group of terminations having a common grouping parameter; and,
   transmitting, by said media gateway or media gateway controller, a command containing said grouping parameter to the other of the media gateway or media gateway controller.

15. A media gateway or media gateway controller, comprising:
   a receiver for receiving messages relating to individual terminations, each such message containing a grouping parameter, and for receiving commands addressed to all contexts and all terminations, such commands containing a grouping parameter or a Boolean expression of grouping parameters;

a database for storing the grouping parameter included in each message for an individual termination; and, a control unit for checking whether the grouping parameter or Boolean expression of grouping parameters contained in each received command corresponds to any stored grouping parameters for each individual termination, wherein the control unit executes the received command for an individual termination when the grouping parameter contained in the received command corresponds to a stored grouping parameter for said individual termination.

* * * * *